(12) United States Patent
Gilles

(10) Patent No.: US 6,913,118 B2
(45) Date of Patent: Jul. 5, 2005

(54) DISC BRAKE

(75) Inventor: Leo Gilles, Koblenz (DE)

(73) Assignee: Lucas Automotive GmbH (DE)

( * ) Notice: Subject to any disclaimer, the term of this patent is extended or adjusted under 35 U.S.C. 154(b) by 12 days.

(21) Appl. No.: 10/827,092

(22) Filed: Apr. 19, 2004

(65) Prior Publication Data

US 2004/0195052 A1 Oct. 7, 2004

Related U.S. Application Data

(63) Continuation of application No. PCT/EP02/11859, filed on Oct. 23, 2002.

(30) Foreign Application Priority Data

Oct. 24, 2001 (DE) .......................... 101 52 423

(51) Int. Cl.[7] .............................. F16D 66/00
(52) U.S. Cl. ................................. 188/1.11 E
(58) Field of Search ............... 188/1.11 R, 1.11 E, 188/72.1, 72.7, 72.8, 156, 157, 158, 161, 162

(56) References Cited

U.S. PATENT DOCUMENTS

| | | | |
|---|---|---|---|
| 4,532,462 A | * | 7/1985 | Washbourn et al. ........ 188/162 |
| 5,720,534 A | | 2/1998 | Stumpe ..................... 303/166 |
| 5,767,768 A | * | 6/1998 | DiSaverio ............. 188/1.11 R |
| 6,059,379 A | | 5/2000 | Deml et al. |
| 6,176,352 B1 | * | 1/2001 | Maron et al. .............. 188/72.1 |
| 6,217,131 B1 | * | 4/2001 | Schanzenbach ............ 188/158 |
| 6,279,694 B1 | | 8/2001 | Böhm et al. ............... 188/162 |
| 6,394,235 B1 | | 5/2002 | Poertzgen et al. ......... 188/72.6 |
| 6,536,562 B1 | | 3/2003 | Böhm et al. |

FOREIGN PATENT DOCUMENTS

| | | | |
|---|---|---|---|
| DE | 44 24 270 | 1/1996 | |
| DE | 195 36 695 | 4/1997 | |
| DE | 196 39 686 | 4/1998 | |
| DE | 197 30 094 | 1/1999 | |
| DE | 198 35 550 | 2/2000 | |
| DE | WO 03/03544 A2 * | 5/2003 | ........... B60T/13/00 |
| EP | 0 509 225 | 10/1992 | |
| EP | 1 186 495 | 3/2002 | |
| WO | 99/05011 | 2/1999 | |

OTHER PUBLICATIONS

Document Bibliography and Abstract for DE 44 24 270 from the European Patent Office website; http://v3.espacenet.com/textdoc?DB=EPODOC&IDX=DE4424270, printed Apr. 9, 2004.

Document Bibliography and Abstract for DE 195 36 695 from the European Patent Office website; http://v3.espacenet.com/textdoc?DB=EPODOC&IDX=DE19536695, printed Apr. 9, 2004.

(Continued)

*Primary Examiner*—Thomas Williams
(74) *Attorney, Agent, or Firm*—MacMillan, Sobanski & Todd, LLC

(57) ABSTRACT

The invention relates to a disc brake (10) having two brake shoes (12, 14), which for generating a clamping force (A, A') are pressable against both sides of a brake disc (16), and having an actuator device (26) for actuating at least one of the brake shoes (12, 14). The disc brake (10) has a detection device, which detects the coming-into-abutment of at least one of the brake shoes (12, 14) against the brake disc (16) and during the coming-into-abutment adopts a characteristic state. This discrete state may be a switching state electrically evaluable for open- or closed-loop control purposes and may be used for open- or closed-loop control of a brake system comprising the disc brake (10).

10 Claims, 3 Drawing Sheets

OTHER PUBLICATIONS

Document Bibliography and Abstract for DE 196 39 686 from the EurpoeanPatent Office website; http://v3.espacenet.com/textdoc?DB=EPODOC&IDX=DE19639686, printed Apr. 9, 2004.

Document Bibliography and Abstract for DE 197 30 094 from the Eurpoean Patent Office website; http://v3.espacenet.com/textdoc?DB=EPODOC&IDX=DE19730094, printed Apr. 9, 2004.

Document Bibliography and Abstract for WO 99/05011 from the European Patent Office website; http://v3.espacenet.com/textdoc?DB=EPODOC&IDX=WO9905011, printed Apr. 9, 2004.

* cited by examiner

DISC BRAKE

CROSS REFERENCE TO RELATED APPLICATIONS

This application is a continuation of International Application No. PCT/EP02/11859 filed Oct. 23, 2002, the disclosures of which are incorporated herein by reference, and which claimed priority to German Patent Application No. 101 52 423.4 filed Oct. 24, 2001, the disclosures of which are incorporated herein by reference, and is related to U.S. Ser. No. 10/829,536 filed Apr. 22, 2004.

BACKGROUND OF THE INVENTION

The invention relates to a disc brake having two brake shoes, which for generating a clamping force are pressable against both sides of a brake disc, and having an actuator device for actuating at least one of the brake shoes. The invention further relates to a method of effecting open- or closed-loop control of a brake system comprising such a disc brake.

A disc brake of the described type is known from WO 99/05011, and corresponding U.S. Pat. No. 6,394,235 which is incorporated by reference herein. The forces arising in said disc brake during a braking operation may be subdivided into clamping force (also known as axial force, transverse force, brake application force or normal force) and peripheral force (also known as frictional force). The component of force introduced by a brake shoe into the brake disc at right angles to the plane of the brake disc is described as a clamping force. By peripheral force, on the other hand, is meant the component of force, which on account of the brake friction between a friction lining of the brake shoe and the brake disc acts in peripheral direction of the brake disc upon the brake shoe. By multiplying the peripheral force by the distance of the application point of the peripheral force from the axis of rotation of the wheels, the braking torque may be determined.

In the disc brake known from WO 99/05011, the clamping force is generated either hydraulically or by means of an electric motor. In the case of hydraulic clamping force generation, a pressurized hydraulic fluid is introduced into a hydraulic chamber formed in a housing of the disc brake. A hollow piston of an actuator device accommodated displaceably in the hydraulic chamber is moved by the hydraulic fluid in the direction of one of the two brake shoes and brings it into frictional engagement with the brake disc. Since the disc brake is designed as a floating-caliper disc brake, in a known manner the brake shoe not interacting directly with the piston is also pressed against the brake disc.

In the case of clamping force generation by means of a motor, the rotational movement of a motor shaft is first stepped down by means of a planetary gear and then converted into a translational movement by means of a nut/spindle arrangement of the actuator device that is disposed inside the hollow piston. The hollow piston is seized by this translational movement and transmits the translational movement to one of the two brake shoes, which is subsequently pressed against the brake disc.

Future brake systems, for open- and closed-loop control purposes, require an exact acquisition of the forces arising during a braking operation. It is therefore customary to equip disc brakes with one or more force sensors and to connect these force sensors to open- and closed-loop control circuits.

In WO 99/05011 it is proposed to improve control of the disc brake by providing a force sensor, which detects the clamping force and may be disposed e.g. in or at a brake shoe or alternatively in the hollow piston. By means of such a force sensor the clamping force may be detected over a wide clamping force range and a suitable control signal may be generated.

In DE 196 39 686 A1, and corresponding U.S. Pat. No. 6,059,379 which is incorporated by reference herein, a disc brake equipped with force sensors is likewise described. The disc brake possesses two force sensors, which are disposed in each case on a fastening screw, by means of which a caliper is connected to a vehicle-fixed holder. The force sensors are used to detect the peripheral force, which a control device of an electromechanical wheel brake actuator, which is not described in detail, takes into account during setting of the clamping force.

SUMMARY OF THE INVENTION

The underlying object of the invention is to indicate a disc brake, the construction of which is optimized in particular for open- and closed-loop control purposes.

Proceeding from a disc brake of the initially described type, this object is achieved according to the invention in that a detection device is provided for detecting the coming-into-abutment of at least one of the brake shoes against the brake disc, wherein the detection device during the coming-into-abutment adopts a characteristic state.

In contrast to conventional force sensors, during the coming-into-abutment the detection device according to the invention assumes, not an undefined state within a continuum, but a characteristic, i.e. clearly defined state preferably consisting of a plurality of discrete and mutually demarcated states. It is therefore possible, for example, for the detection device during the coming-into-abutment of at least one of the brake shoes against the brake disc to adopt a characteristic one of two possible states from a digital state quantity (e.g. on/off).

The detection device may take the form of an active or passive device. It is therefore conceivable that an active detection device during the coming-into-abutment generates a discrete electrical state signal. A passive detection device during the coming-into-abutment may be transferred to a discrete mechanical, preferably electrically evaluable state. The characteristic state may therefore be both of a mechanical and of an electrical nature.

Preferably the detection device remains during the entire braking operation in the state characteristic of the coming-into-abutment of at least one of the brake shoes against the brake disc. This characteristic state is then an indication not only of the operation of coming into abutment but also of the state of being in abutment.

From the previous explanations it is clear that by using the detection device according to the invention a discrete signal for open- or closed-loop control of a brake system may be generated, which is characteristic of the coming-into-abutment of at least one of the brake shoes against the brake disc. Such a discrete signal may be evaluated by open- or closed-loop control algorithms much more easily than e.g. a continuous output signal of a conventional force sensor.

In many areas of application the detection device according to the invention may replace the complex and hence costly force sensors that have been used up until now. It is therefore conceivable, in the case of a motor-actuable disc brake, to use the detection device according to the invention for reliable detection of the coming-into-abutment of at least one of the brake shoes against the brake disc and to effect closed-loop control e.g. of the clamping or peripheral force after detection of the coming-into-abutment without sensors by evaluating the motor power consumption or the angle of rotation of a rotor of the motor. It is however also conceivable to use the detection device according to the invention in combination with one or more conventional force sensors, e.g. clamping force sensors or peripheral force sensors.

Preferably the detection device adopts the state characteristic of the coming-into-abutment upon attainment of a predefined clamping force- or peripheral force threshold. As the coming-into-abutment of at least one of the brake shoes against the brake disc is a continuous operation, such a procedure allows a defined determination of the point, from which onwards a coming-into-abutment that is significant for open- and closed-loop control purposes is to be assumed. As the operation of coming into abutment is to be detected, the ruling force threshold is advantageously set comparatively low. It has proved advantageous to set the force threshold below approximately 100 N. In a meaningful manner the force threshold lies in the range between 50 and 90 N and is preferably approximately 80 N.

The detection device may comprise an elastic element, which is disposed functionally between at least one of the brake shoes and the actuator device and the elastic properties of which determine the clamping force threshold. In an advantageous manner, the elastic element is already in a biased state before the start of a braking operation. The elastic element may, for example, be formed by a helical spring or form spring or be made of an elastomeric material. According to a preferred development of the invention the elastic element is disposed inside a cage, which is rigidly coupled to the actuator device and inside which at least one of the brake shoes is displaceable to a limited extent relative to the actuator device. The cage may moreover function as a guide for the at least one brake shoe accommodated therein.

For realizing the detection device various options are available. A common feature of all of these options is the functional aspect that the detection device adopts a state evaluable for open- and closed-loop control purposes as soon as at least one of the brake shoes comes into abutment against the brake disc. It is therefore conceivable, for example, to design the detection device as a switching device. The mode of operation of the switching device may be based on a mechanical or an electrical switching principle. An example of a mechanical switching principle is the movement of switching means as a reaction to the coming-into-abutment of at least one of the brake shoes against the brake disc. An electrical switching principle may be based on the Hall effect.

A preferred form of construction of a switching device based on a mechanical switching principle possesses at least one contact pair comprising a first contact and a second contact, wherein the two contacts are designed in such a way that upon the coming-into-abutment of at least one of the brake shoes against the brake disc they adopt a characteristic switching state relative to one another. This switching state characteristic of the coming-into-abutment may consist of a breaking or a making of an electric circuit. The characteristic switching state accompanied by a breaking of an electric circuit is particularly advantageous because in said case there may be an accompanying mechanical uncoupling of the contact pair from the reactive forces arising during a braking operation.

Advantageously, the elastic element is disposed functionally between the first contact and the second contact. It is thereby possible e.g. to achieve the effect that the contacts adopt the characteristic switching state only after a compression of the elastic element, i.e. after the clamping force threshold has been exceeded. It has proved advantageous to couple the one contact to at least one of the brake shoes and to couple the other contact interacting with this contact to the actuator device. The other contact may be coupled to a translationally movable element of the actuator device in such a way that the breaking or making of the electric circuit is induced by a movement of the actuator device.

For the design of the actuator device various concepts are available. The actuator device may be actuable by means of a motor or hydraulically. It is moreover possible for one and the same actuator device to be designed so as to be actuable both hydraulically and by means of a motor. Given such a design of the actuator device, an emergency- or parking brake function may be realized by means of the motor actuation. According to a preferred development of the invention the disc brake is part of an electrohydraulic brake system.

Advantageously, depending on the design of the actuator device the already mentioned translationally movable actuator element of the actuator device may additionally be set in rotation. When the actuator device comprises a nut/spindle arrangement, the translationally movable actuator element may be formed either by the nut or by the spindle of the nut/spindle arrangement. The translationally movable actuator element might however also be a separate component, which may be designed so as to be connectable to the nut or the spindle of the nut/spindle arrangement. Thus, the translationally movable actuator element may be formed e.g. by a piston, which interacts with one of the brake shoes and surrounds the nut/spindle arrangement radially at the outside. In the case of a hydraulically actuable actuator device, the translationally movable actuator element may be formed by a piston, which is driven by the hydraulic fluid.

Other advantages of this invention will become apparent to those skilled in the art from the following detailed description of the preferred embodiment, when read in light of the accompanying drawings.

DETAILED DESCRIPTION OF THE INVENTION

Figure 1:
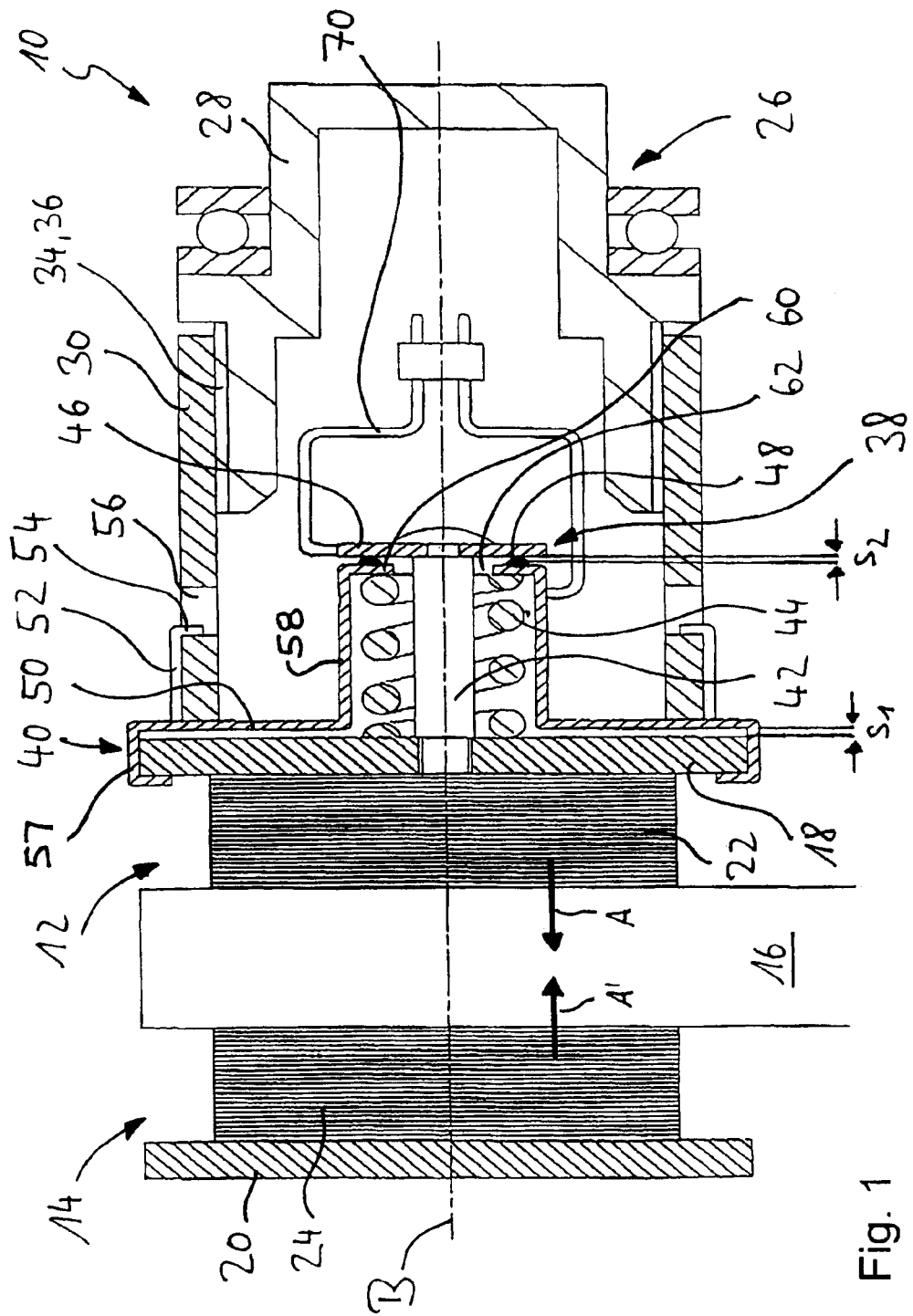
FIG. 1 a sectional view of part of a first embodiment of a disc brake according to the invention.

In FIG. 1 the essential components of a floating-caliper disc brake 10 according to a first embodiment of the invention are illustrated. The disc brake 10 comprises two brake shoes 12, 14, which are pressable against both sides of a brake disc 16. Each of the two brake shoes 12, 14 has a carrier plate 18, 20 as well as a friction lining 22, 24 disposed on the carrier plate 18, 20. The two brake shoes 12, 14 interact by means of the respective brake lining 22, 24 with the brake disc 16. During the interacting of the brake shoes 12, 14 with the brake disc 16 a clamping force acting in the direction-of the-arrows A, A' is generated.

For generating the clamping force an electric motor is provided, which is not shown in FIG. 1 and in a known manner interacts with a step-down gear, which is not shown in FIG. 1. An output end of the step-down gear is connected to an actuator device 26. The actuator device 26 converts a rotational movement of the electric motor into a translational movement for the translatory actuation of the brake shoes 12, 14.

In the embodiment according to FIG. 1 the actuator device 26 is a nut/spindle arrangement comprising a rotatory cup-shaped spindle 28 as well as a nut 30 in the form of a hollow-cylindrical piston, which is disposed coaxially with the spindle 28 and radially at the outside relative to the spindle 28.

The actuator device 26 is designed in such a way that a rotational movement of the spindle 28 about a longitudinal axis B of the disc brake 10 is converted into a translational movement of the nut 30 along said longitudinal axis B. For this purpose, the cup-shaped spindle 28 is provided with an external thread 34, which interacts with a complementary internal thread 36 of the nut 30. The nut 30 is mounted in a rotationally fixed manner inside a housing of the disc brake 10 that is not shown in FIG. 1.

The spindle 28 may be coupled to the step-down gear, which is not shown in FIG. 1, in various ways, e.g. by means of a curved-tooth system. In the case of a curved-tooth system, there is not just a rotationally fixed connection between spindle 28 and step-down gear, but the spindle 28 is movable within a specific angular range about the longitudinal axis B. Transverse forces arising during the rotational movement of the spindle 28 may in said manner be reliably compensated.

The disc brake 10 has a detection device 38 in the form of a switching device, which during the coming-into-abutment of the brake shoes 12, 14 against the brake disc 16 takes up a switching state characteristic of this coming-into-abutment. The detection device 38 is composed of a cage 40 rigidly coupled to the nut 30, a piston-like extension 42 of the carrier plate 18 disposed partially inside the cage 40, an elastic element in the form of a helical spring 44 radially externally surrounding the extension 42, and a contact pair 46, 48.

The cage 40 has an annular carrier disc 50, which in the normal position of the actuator device 26 shown in FIG. 1 lies flat against the end faces of the spindle 28 and the nut 30 facing the brake disc 16. On a surface of the carrier disc 50 remote from the brake disc 16 a plurality of detent arms 52 are disposed, which extend substantially at right angles to the carrier disc 50. For the rigid coupling of the cage 40 to the actuator device 26, the detent arms 52 lie radially against the outside of the nut 30, wherein hook-like extensions 54 of the detent arms 52 engage without play into detent openings 56 provided for this purpose in the nut 30.

Inside the cage 40 rigidly coupled to the nut 30 the brake shoe 12, more precisely the carrier plate 18 of the brake shoe 12, is guided so as to be displaceable to a limited extent along the longitudinal axis B. For guiding the brake shoe 12 a plurality of retaining arms 57 are provided, which are formed on a surface of the carrier disc 50 facing the brake disc 16 and extend substantially at right angles to the carrier disc 50. These retaining arms 57 engage behind the carrier plate 18 of the brake shoe 12 in such a way that the brake shoe 12 has an axial play $s_1$ along the longitudinal axis B relative to the nut 30 of the actuator device 26. The retaining arms 57 therefore, on the one hand, act as a guide for the brake shoe 12 and, on the other hand, restrict the mobility of the brake shoe 12 relative to the actuator device 26 along the longitudinal axis B.

Radially at the inside the annular carrier disc 50 changes into a pot-shaped indentation 58 extending away from the brake disc 16. The indentation 58 extends into the cup-shaped spindle 28 and lies without play against an inner wall of the spindle 28. In the base 60 of the pot-shaped indentation 58 a through-opening 62 is provided. The piston-like extension 42 of the carrier plate 18 extends through this through-opening 62.

The extension 42 is coupled by its one end rigidly to the carrier plate 18 and on its end projecting through the through-opening 62 carries an annular contact washer 46, the outside diameter of which is greater than the diameter of the through-opening 62. The contact washer 46 is designed so as to interact electrically with an annular contact 48, which is formed on a surface of the base 60 of the indentation 58 remote from the brake disc 16.

The helical spring 44, which is disposed inside the indentation 58 and radially outside relative to the extension 42, is in a biased state and is supported by its one end against the carrier plate 18 and by its other end against the base 60 of the indentation 58. In this manner the brake shoe 12 is biased relative to the cage 40, and hence also relative to the nut 30 of the actuator device 26 coupled rigidly to the cage 40. The normal position of the brake shoe 12 relative to the actuator device 26 prior to an actuation of the disc brake 10 is defined by means of this bias. At the same time, it defines the switching state of the detection device 38 in the non-actuated state of the disc brake 10. As FIG. 1 reveals, in this normal position the contact washer 46 contacts the annular contact 48. The switching state of the detection device 38 is therefore "closed". The switching state may be communicated by means of electric feeders 70 to an open- or closed-loop control circuit, which is not shown in FIG. 1. In order to transfer the detection device 38 to the "open" switching state, a defined contact opening distance $s_2$ has to be negotiated. This contact opening distance $s_2$ is smaller than the axial play $s_1$ of the brake shoe 12 inside the cage 40.

There now follows a detailed description of the mode of operation of the disc brake 10 illustrated in FIG. 1.

When, starting from the normal position of the disc brake 10 shown in FIG. 1, the electric motor not shown in FIG. 1 is set in operation in order to generate a clamping force, the step-down gear, which is likewise not shown in FIG. 1, transmits a rotational movement of the electric motor to the spindle 28 of the actuator device 26. For generating a clamping force, the direction of rotation of the spindle 28 is selected in such a way that the nut 30 interacting with the spindle 28 is moved in FIG. 1 to the left.

The cage 40 and the brake shoe 12, which is biased in the direction of the brake disc 16 by the helical spring 44 supported against the cage 40, are also seized by this translatory movement of the nut 30. The brake shoe 12 is therefore pressed in the direction of the arrow A against the brake disc 16. Because of the structural design of the disc brake 10 as a floating-caliper disc brake, as a reaction to the pressing of the brake shoe 12 against the brake disc 16 the opposite brake shoe 14 is also pressed in the direction of the arrow A' against the brake disc 16. In this manner a clamping force acting in the direction of the arrows A, A' is generated.

In accordance with the physical principle actio=reactio, upon generation of the clamping force a reactive force retroacts in the opposite direction upon the brake shoe 12. As a result of this reactive force the brake shoe 12 is inside the cage 40 is displaced in FIG. 1 to the right relative to the actuator device 26 and the already biased helical spring 44 is further compressed. In the course of this displacement of the brake shoe 12 the axial play $s_1$ is gradually used up. Furthermore, the extension 42 coupled rigidly to the carrier plate 18 of the brake shoe 12 is seized by this displacement so that the contact plate 46 fastened to the extension 42 is displaced in FIG. 1 to the right relative to the contact ring 48. As soon as during this displacement of the contact plate 46 the contact opening distance $s_2$ is exceeded, the detection device 38 adopts the discrete "open" switching state. This new switching state corresponds to a breaking of an electric circuit comprising the electric feeders 70 and may be detected by the open- or closed-loop control circuit, which is not shown in FIG. 1.

The discrete "open" switching state is characteristic of the coming-into-abutment of the brake shoes 12, 14 against the brake disc 16 and is adopted when a predefined clamping force threshold is reached. This predefined clamping force threshold is determined by the properties of the helical spring 44. The helical spring 44 is designed in such a way that the contact opening distance $s_2$ corresponds to a fictitious hydraulic actuating pressure of approximately 2 bar referred to a piston diameter of 57 mm. The clamping force threshold is therefore in the order of magnitude of 80 N. This means that, when a defined clamping force value of 80 N is reached, the characteristic "open" switching state is adopted and a coming-into-abutment of the brake shoes 12, 14 against the brake disc 16 is assumed.

As soon as the characteristic "open" switching state is detected by the open- or closed-loop control circuit not shown in FIG. 1, closed-loop control of the clamping force begins. In the embodiment according to FIG. 1 this closed-loop control is based, not on the evaluation of a signal of a clamping force sensor, but on an evaluation of the angle of rotation of a rotor of the motor not shown in FIG. 1 and/or an evaluation of a power consumption of this motor. In addition or as an alternative to this procedure, the angle of rotation of the spindle 28 may also be used for closed-loop control purposes.

Figure 2:
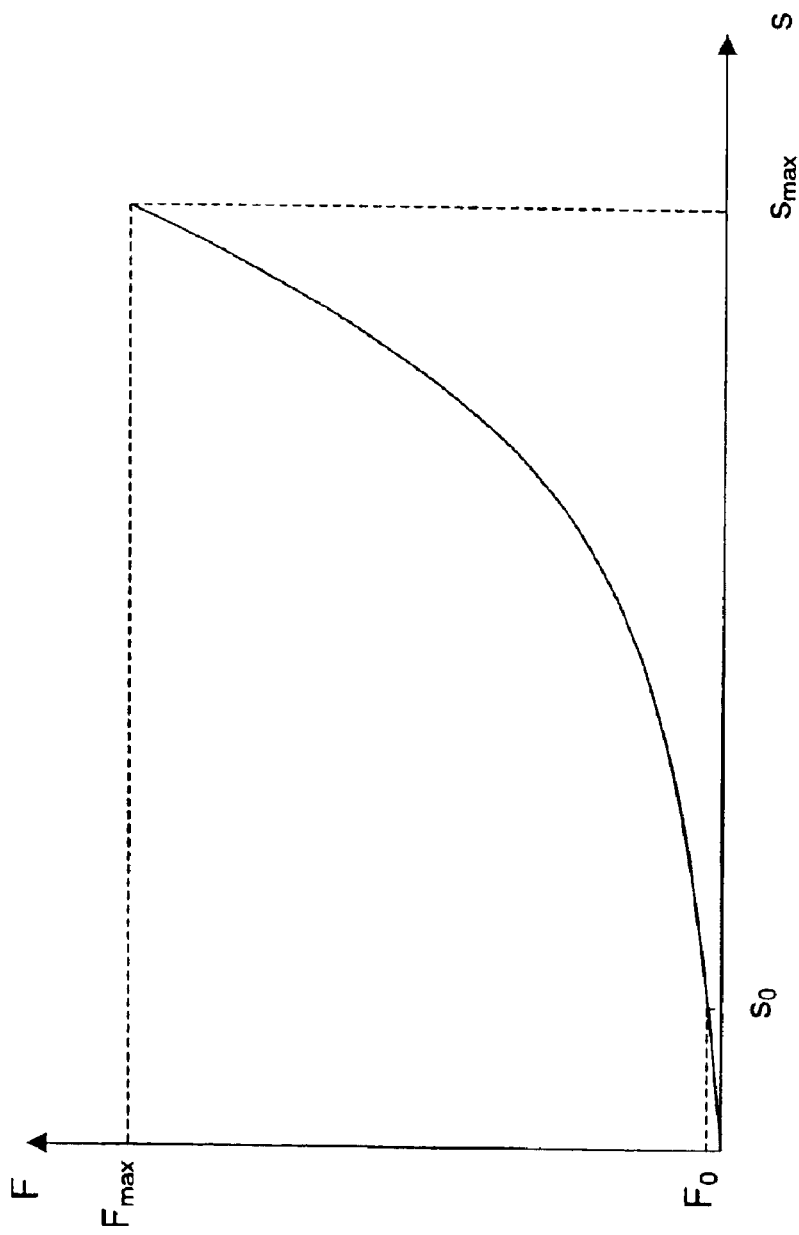
FIG. 2 a graph illustrating the dependence of the clamping force upon the brake application stroke of the actuator device.

The previously described closed-loop control is described in detail below with reference to the clamping force characteristic illustrated in FIG. 2. FIG. 2 shows the characteristic of the clamping force F as a function of the brake application stroke s of the nut 30. In the normal state of the disc brake 10 prior to the initiation of a braking operation the brake linings 22, 24 should be disposed at a slight distance from the brake disc 16 in order to avoid frictional abrasion. For this purpose, the brake shoes 12, 14 may be pulled by motor slightly away from the brake disc 16 by means of the cage 40 coupled to the actuator device 26. For the following examination of the clamping force characteristic of FIG. 2 it is assumed that, in the normal state of the disc brake 10, the distance between the brake linings 22, 24 and the brake disc 16 is negligibly small and the brake shoe 12 is already displaced inside the cage 40 upon an infinitesimal brake application-stroke s.

At the start of a braking operation ($s<s_2$) the detection device 38 is in the "closed" switching state and as yet no closed-loop control of the clamping force occurs. When, given a brake application stroke $s_0$ ($=s_2$), the clamping force reaches the defined clamping force threshold of $F_0=80$ N, the detection device 38 adopts the "open" switching state characteristic of the coming-into-abutment of the brake shoes 12, 14 against the brake disc 16. As soon as this switching state of the detection device 38 is detected by the open- or closed-loop control circuit, the already described closed-loop control of the clamping force is effected for a brake application stroke $s>s_0$. In FIG. 2 it may clearly be seen that the clamping force threshold $F_0$ is set extremely low compared to the maximum occurring clamping force $F_{max}$ and may therefore actually be used as an indication of the coming-into-abutment of the brake shoes 12, 14 against the brake disc 16.

In the course of the previous discussion the generating of the clamping force and the detecting of the coming-into-abutment of the brake shoes 12, 14 against the brake disc 16 were described. In order to discontinue or reduce the clamping force, the electric motor, not shown in FIG. 1, for actuating the actuator unit 26 is controlled in such a way that the spindle 28 alters its direction of rotation. As a result of the reversal of the direction of rotation the nut 30 is moved in FIG. 1 to the right, with the result that the clamping force generated by the brake shoes 12, 14 is reduced.

Figure 3:
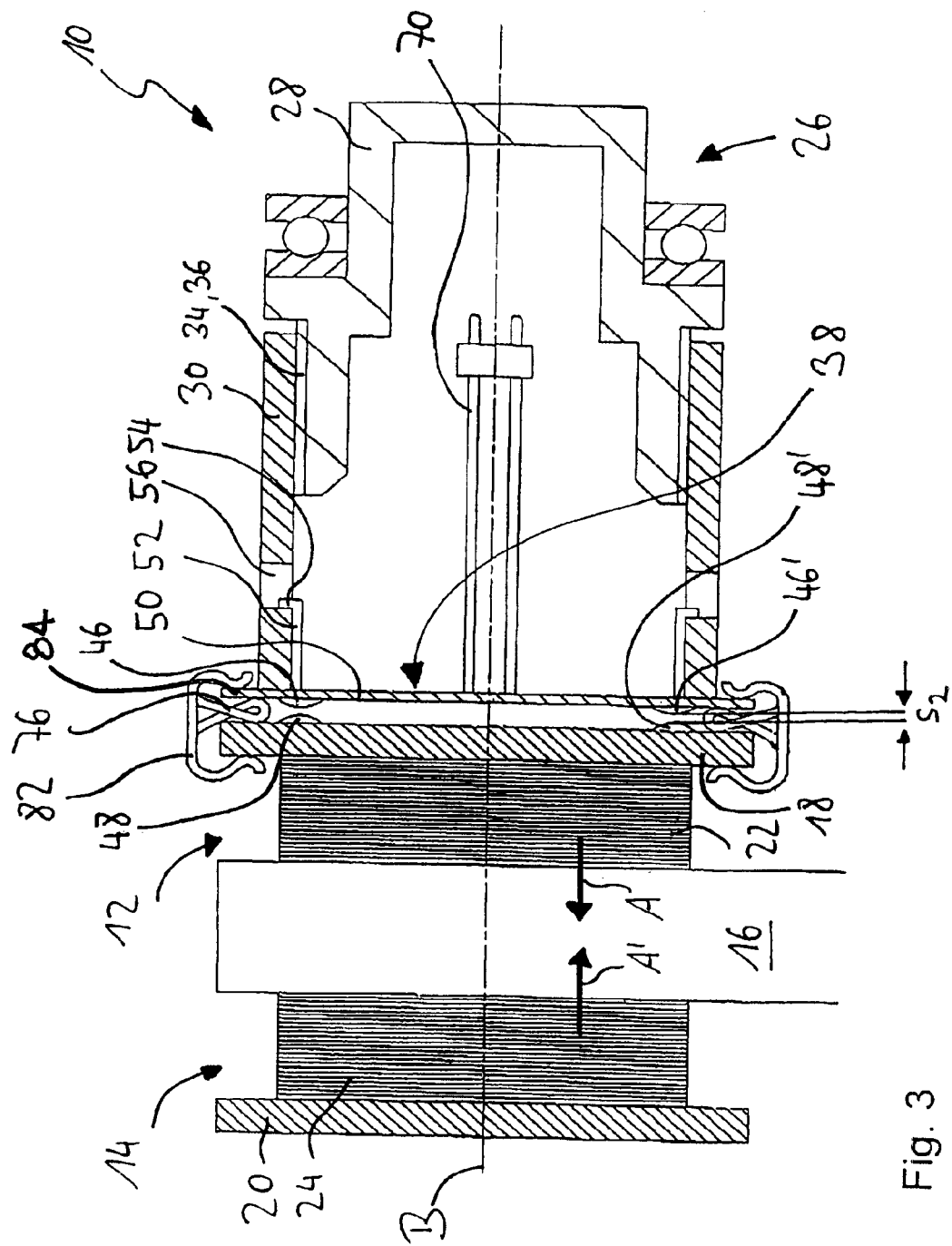
FIG. 3 a sectional view according to FIG. 1 of part of a second embodiment of a disc brake according to the invention.

In FIG. 3 the essential components of a floating-caliper disc brake 10 according to a second embodiment of the invention are illustrated. The disc brake 10 according to the second embodiment partially corresponds in construction and function to the floating-caliper disc brake according to the first embodiment described with reference to FIG. 1. For this reason, in the following only the constructional and functional differences between these disc brakes are described.

The disc brake 10 illustrated in FIG. 3 has a detection device 38 in the form of a switching device, which comprises a carrier disc 50 rigidly coupled to a translationally movable nut 30 of an actuator device 26, a plurality of form springs 76, as well as two contact pairs 46, 48, 46', 48'. The carrier disc 50 is disposed on an end face of the nut 30 facing the brake disc 16. For the rigid coupling of the carrier disc 50 to the nut 30, a plurality of detent arms 52 are disposed on a surface of the carrier disc 50 remote from the brake disc 16 and lie radially against the inside of the nut 30 and engage without play into detent openings 56 of the nut 30.

A plurality of clamps 82 are slipped over a portion 84 of the carrier disc 50 projecting radially out beyond the nut 30 and over a region of the carrier plate 18 lying opposite said portion 84 and fixes the brake shoe 12 relative to the nut 30. The form springs 76 are formed in each case integrally with the clamps 82 and disposed approximately in the middle between the arms of the clamps 82 embracing the carrier plate 18 and the carrier disc 50. More precisely, the form springs 76 are disposed in a gap between the carrier plate 18 of the brake shoe 12 and the carrier disc 50.

On a surface of the carrier disc 50 facing the carrier plate 18 of the brake disc 12 the two first contacts 46, 46' of each of the two contact pairs are disposed. On a surface of the carrier plate 18 facing the carrier disc 50 the two second contacts 48, 48' of the two contact pairs are formed in each case opposite the first contacts 46, 46'. The two first contacts 46, 46' are designed electrically as separate contacts and coupled in each case to a separate electric feeder 70. The two second contacts 48, 48', on the other hand, are electrically connected to one another by the carrier plate 18.

The form springs 76 disposed in the gap between the carrier disc 50 and the carrier plate 18 ensure that in the normal state of the disc brake 10 illustrated in FIG. 3 there is a specific contact closing distance $s_2$ between each of the first contacts 46, 46' and the respective corresponding second contact 48, 48'. In the normal position of the disc brake 10 illustrated in FIG. 3 the detection device 38 is therefore in the "open" switching state.

When, starting from the normal position of the disc brake 10 illustrated in FIG. 1, the nut 30 is actuated in FIG. 3 to the left in order to generate a clamping force, this translatory movement of the nut 30 is transmitted via the form springs 76 to the brake disc 12 and, in the manner already described with reference to FIG. 1, a clamping force is generated. The reactive force accompanying the clamping force generation effects a compression of the form springs 76 and a reduction of the clearance in air between the respective contacts 46, 48, 46', 48' of the two contact pairs. As soon as the contact closing distance $s_2$ has been fully used up, the detection device 38 adopts the discrete "closed" switching state characteristic of the coming-into-abutment of the brake shoes 12, 14 against the brake disc 16 and the previously described closed-loop control of the clamping force begins.

As in the first embodiment, the detection device 38 adopts the "closed" switching state characteristic of the coming-into-abutment only after a predefined clamping force threshold has been reached. This clamping force threshold is determined by the elastic properties of the form springs 76 and, as in the disc brake according to the first embodiment, is approximately 80 N.

Compared to the disc brake according to the first embodiment, the disc brake according to the second embodiment is of a less complex design and is therefore less costly to manufacture. The disc brake according to the first embodiment, on the other hand, has the advantage that the reactive forces arising during a braking operation are not transmitted via the contacts and the contacts therefore have a longer life.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A disc brake comprising
  a brake disc;
  two brake shoes, which for generating a clamping force are pressable against opposite sides of the brake disc;
  an actuator device for actuating at least one of the brake shoes; and
  a detection device for detecting the coming-into-abutment of at least one of the brake shoes against the brake disc, wherein the detection device is designed as a switching device comprising at least one contact pair having a first contact and a second contact, which upon the coming-into-abutment of at least one of the brake shoes against the brake disc adopt a characteristic switching state relative to one another, and wherein the detection device includes an elastic element, the elastic properties of which oppose the adoption of the characteristic switching state, the elastic element being disposed functionally between the first contact and the second contact.

2. The disc brake according to claim 1, wherein the detection device adopts the characteristic switching state when a force threshold determined by the elastic properties of the elastic element is reached.

3. The disc brake according to claim 2, wherein the force threshold lies below approximately 100 N.

4. The disc brake according to claim 1, wherein the first contact is coupled to the actuator device and the second contact is coupled to at least one of the brake shoes.

5. The disc brake according to claim 1, wherein at least one of the brake shoes is accommodated in a cage, which is rigidly coupled to the actuator device, so as to be displaceable to a limited extent relative to the actuator device.

6. A disc brake comprising
  a brake disc;
  two brake shoes, which for generating a clamping force are pressable against opposite sides of the brake disc;
  an actuator device for actuating at least one of the brake shoes; and
  a detection device for detecting the coming-into-abutment of at least one of the brake shoes against the brake disc, wherein the detection device, during the coming-into-abutment, adopts a characteristic state and includes an elastic element, the elastic properties of which oppose the adoption of the characteristic state;
  wherein at least one of the brake shoes is accommodated in a cage, which is rigidly coupled to the actuator device, so as to be displaceable to a limited extent relative to the actuator device.

7. The disc brake according to claim 6,
  wherein the detection device adopts the characteristic state when a force threshold determined by the elastic properties of the elastic element is reached.

8. The disc brake according to claim 6,
  wherein the force threshold lies below approximately 100 N.

9. The disc according to claim 6,
  wherein the detection device is designed as a switching device.

10. The disc brake according to claim 9,
  wherein the switching device comprises at least one contact pair having a first contact and a second contact, which upon the coming-into-abutment of at least one of the brake shoes against the brake discs adopt a characteristic switching state relative to one another.

* * * * *